United States Patent [19]

Chow et al.

[11] Patent Number: 4,639,142
[45] Date of Patent: Jan. 27, 1987

[54] DIMENSION MONITORING TECHNIQUE FOR SEMICONDUCTOR FABRICATION

[75] Inventors: Pei-Ming D. Chow, Yorba Linda; Keh-Fei C. Chi, Torrance, both of Calif.

[73] Assignee: Rockwell International Corporation, Anaheim, Calif.

[21] Appl. No.: 484,666

[22] Filed: Apr. 13, 1983

[51] Int. Cl.⁴ ............................................. G01B 11/00
[52] U.S. Cl. .................................................... 356/372
[58] Field of Search .......................... 356/372; 355/53; 430/30

[56] References Cited

PUBLICATIONS

Murray, Kevin, "Measuring Dimensions Using Murray Daggers" *Semiconductor International,* Dec. 1982.

Primary Examiner—R. A. Rosenberger

[57] ABSTRACT

A method of visually monitoring the change in dimensions of elements on a surface of a semiconductor body during processing is provided. A fixed pattern of scale images on the surface with a predetermined distance between images, together with a wedge-shaped element is provided on the surface. The wedge element has an apex adjacent one of the images and extends in a direction along other ones of the images. The semiconductor body is processed and the dimensions of the wedge-shaped element (as well as the scale image) change. One may then subsequently visually inspect the wedge shaped element with respect to the pattern of images to determine the extent of the change in dimension of the wedge shaped element during processing.

4 Claims, 3 Drawing Figures

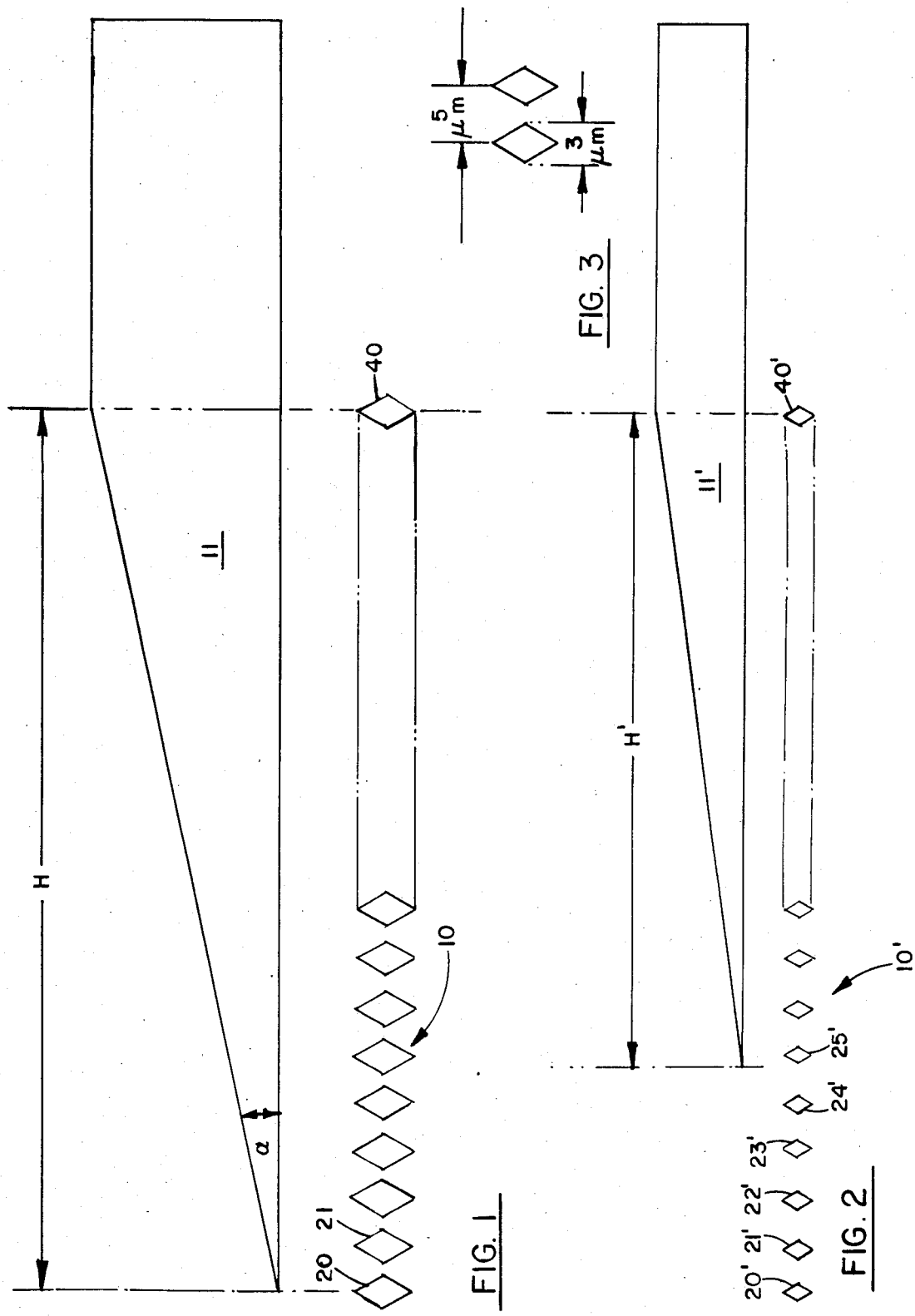

DIMENSION MONITORING TECHNIQUE FOR SEMICONDUCTOR FABRICATION

BACKGROUND OF THE INVENTION

1. Field of the Invention

The invention relates to semiconductor fabrication, and in particular the design of a critical dimension test structure for measuring the change in dimensions of elements on the surface of a semiconductor integrated circuit during processing.

2. Description of the Prior Art

Most semiconductor devices are now made by photolithographic techniques. Such techniques involve the exposure of the surface, coated with light-sensitive material, of a semiconductor body to a particular pattern, and the subsequent formation or development of that pattern into permanent form through the use of wet or dry etching techniques that create various regions and structures on the surface of the semiconductor body. As is well known in the art, photolithographics procedures require that masks be used to define those portions of the semiconductor material where various portions of the semiconductor devices are to be located. Because different parts of these semiconductor devices must be located at precisely defined distances from one another, it is necessary that not only each of the masks be used in forming the semiconductor devices be precisely aligned with respect to one another, but also that each fabrication step which forms or develops one of the regions to a specific dimension also be highly precisely defined both in vertical and horizontal direction.

In many cases, the determination of the pattern determining the fidelity is done by an operation examining the surface of the semiconductor wafer under an optical line width measurement equipment. The use of marks on the mask and the wafer are known to facilitate the dimensional measurement procedure. However, prior to the present invention scale marks were not of use in dimension monitoring to determine the extent of formation or development of particular critical areas of the device in terms of the change in dimensions of lines or areas in response to wet or dry development or etching.

SUMMARY OF THE INVENTION

Briefly and in general terms, the invention provides a method for visually monitoring the change in dimensions of elements defined in the fabrication of semiconductor circuits by photolithography. In particular, the present invention provides a fixed scale pattern of images on the surface of the semiconductor wafer and a wedge-shaped element having an apex adjacent one of the images and extending along a direction corresponding to the pattern formed by other ones of the images. The distances between the images in the scale pattern are predetermined distances. The surface of the semiconductor body is then processed in a manner known in the art (such as by etching or photolithographic development). An operator visually inspects the wedged shaped element after processing with respect to the pattern of fixed images in order to determine the extent of the changes in dimension of the wedge-shaped element as a consequence of the preceding processing step.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWING

FIG. 1 is an illustration of the surface of a semiconductor wafer incorporating a pattern of images forming a scale pattern together with a wedge-shaped element subject to dimensional change prior to processing according to the present invention;

FIG. 2 is an illustration of the surface of the semiconductor wafer incorporating the pattern of images of FIG. 1 after processing; and FIG. 3 is a detailed view of two of the images forming a scale pattern according to the present invention.

DESCRIPTION OF THE PREFERRED EMBODIMENTS

The critical dimension monitor pattern according to the present invention which is intended to be formed on the surface of a semiconductor wafer is illustrated in FIG. 1. FIG. 1 shows a top, highly magnified view of the pattern which consists of a pattern of images that form a measuring scale pattern 10 together with a wedge-shaped element 11 disposed adjacent the scale. In the preferred embodiment of FIG. 1, the scale pattern 10 are represented by diamond shaped marks 20, 21, . . . 40 which are spaced equidistant from one another in a straight line. The wedge element 11 is formed by an acute right triangle or a trapezoid with an acute angle having the smallest acute angle adjacent the extreme diamond shaped mark 20, and having a base extending substantially parallel to the linear direction of the pattern 10. In the embodiment shown in FIG. 1, the element 11 includes a portion having a right angle disposed to the right of the other extreme of the array of diamond shaped marks 40. The distance from the first diamond mark 20 to the last diamond mark 40 is a distance labelled H.

The image shown in FIG. 1 may be defined on a mask used in a photolithographic process for processing a semiconductor wafer, and subsequently is imprinted on the surface of the wafer itself. As an example, the configuration shown in FIG. 1 may be used to expose a photoresist pattern on the surface of the semiconductor wafer. The resulting image will then be transferred to the actual surface of the semiconductor body. Because the development process does not always produce the finest or most precise details on the surface of the semiconductor body, the very sharp image of the apex of the right triangle in the figure may be obscured during processing.

After exposure or processing, the pattern on the surface of the semiconductor wafer may appear as shown in FIG. 2. It is seen that the dimensions of the wedge element 11 (as well as the scale pattern diamond shaped marks 20, 21, . . . 40) have diminished by a factor due to the processing, and accordingly we now label the corresponding elements with prime on the reference numerals. One effect of the change in dimension is that the apex of the wedge element 11' is now no longer adjacent the first scale element 20', but is now located close to the fifth scale element 24'. The extent of the change in the dimension of the features on the wafer is therefore directly related to the location of the apex of the wedge element 11' with respect to the scale pattern 10'. It is therefore seen that visual inspection of the wedge element 11 with respect to the scale pattern 10' of marks 20', 21', 22', etc., is useful for determining the extent of processing or other change in critical dimension of any elements affected by processing on the surface of the semiconductor wafer. Such visual inspection may be performed under the microscope. This procedure (or operation) eliminates the use of the more time and cost consuming optical line width measurement equipment.

It should be noted that the dimensions of the scale pattern diamond shaped marks 20, 21, 22 change as well during the processing. However, since the center of such elements 20', 21', etc. remain fixed in position, the size of such elements is irrelevant for determining the location of the apex of the triangle with respect to a specific mark on the scale pattern. As long as such elements do not entirely disappear from the field of vision, it is possible to determine a critical change in dimension of key elements by making reference to location of the apex of the wedge element 11' with respect to the scale pattern 10'.

To illustrate the typical sizes and dimension of the scale pattern 10 and and the element 11 as used during semiconductor processing, reference may be made to the lengths depicted in FIGS. 1 and 2 and the following equations which illustrate the lengths as a function of the key angles.

CD = Critical dimension on the mask
CD' = After develop (or etch, clean) CD
H = Wedge height on the mask
H' = Theoretical wedge height after develop (or etch, clean)
H'' = The wedge height which the operators will monitor on the diamond scale.
γ = Length of the unresolved wedge apex to be calibrated in a separate measurement
α = Acute angle of the right triangle $$H = \frac{1}{\tan\alpha} \cdot CD$$

$$H' = \frac{1}{\tan\alpha} CD'$$

$$CD' = H'\tan\alpha$$

$$H' = H'' + \gamma$$

$$CD' = (H'' + \gamma)\tan\alpha$$

In the preferred embodiment CD=4 microns, H=100 microns. The centers of the triangular image elements are separated by 5 microns, and their width is 3 microns as shown in FIG. 3, as illustrated in FIG. 3.

While the invention has been illustrated and described as embodied in a dimension monitoring technique for semiconductor fabrication, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitutes essential characteristics of the generic or specific aspects of this invention, and, therefore, such adaptations should and are intended to be comprehended within the meaning and range of equivalence of the following claims.

What is claimed is:

1. A method of visually monitoring the change in dimensions of elements on a surface of a semiconductor body during processing thereof comprising the steps of:
    providing a fixed pattern of images on said surface having a predetermined distance between said images;
    providing a wedge-shaped element on said surface having an apex adjacent one of said images and extending in a direction along other ones of said images;
    processing said semiconductor body in a predetermined manner causing the dimensions of said wedge-shaped element to change;
    subsequently visually inspecting the wedge shaped element with respect to the pattern of images to determine the extent of the change in dimension of said wedge shaped element during processing.

2. A mask for use in semiconductor processing for producing a test pattern for visually monitoring the change in dimensions of elements on a surface of a semiconductor body during processing thereof comprising:
    a fixed scale pattern of images on said surface having a predetermined distance between said images; and
    a wedge shaped element on said surface having an apex adjacent one of said images and extending in a direction along other ones of said images.

3. A mask as defined in claim 2, wherein said scale pattern is composed of diamond shaped marks spaced equally apart.

4. A mask as defined in claim 2, wherein said wedge shaped element is a trapezoid.

* * * * *